Patented Jan. 23, 1951

2,539,269

UNITED STATES PATENT OFFICE 2,539,269

INSECTICIDAL COMPOSITION

Thaddeus Parr, Philadelphia, Pa., assignor to The Pennsylvania Salt Manufacturing Company, Philadelphia, Pa., a corporation of Pennsylvania No Drawing. Application April 23, 1948, Serial No. 22,959

11 Claims. (Cl. 167—42)

This invention relates to insecticide compositions and methods of making the same and more particularly to insecticide emulsion concentrates and methods of preparation where the insecticide is a normally solid material and is substantially insoluble in water.

When making aqueous emulsion insecticide compositions of organic insecticides which are normally solid materials and which are substantially insoluble in water, it is first necessary to dissolve the insecticide in some suitable solvent and then add emulsifiers to the solvent so that the solvent with its dissolved insecticide may be dispersed in water to obtain an aqueous emulsion of the insecticide which can then be used for the spraying of plants or animals. Since the concentration of the insecticide ingredient in the final insecticide solution as used is normally quite small, it is preferable to make an emulsion concentrate of the insecticide ingredient, which concentrate can later be easily added to water and diluted to the particular concentration desired.

When attempts were made to prepare emulsion concentrates of some normally solid organic compounds which were substantially insoluble in water, such as benzene hexachloride, it was found that in order to obtain a reasonably stable emulsion with emulsifiers which would go into solution in the solvents used, it was necessary to use such large amounts of emulsifier that the emulsifier itself tended to blanket the toxic properties of the insecticide ingredient. Many different emulsifiers were tried. However, either the emulsifier was not sufficiently soluble in the solvents used to obtain sufficient concentrations of the emulsifier to give a reasonably stable emulsion, or if the emulsifier was sufficiently soluble in the solvents then the concentration of emulsifier required was such as to suppress or substantially lessen the toxic effects of the insecticide ingredient. The insecticide emulsion compositions formed, therefore, were found to be considerably inferior to what might be expected from knowledge of the actual toxic properties of the insecticide ingredient used.

We have found that the amount of emulsifier required to obtain a reasonably stable aqueous emulsion may be greatly reduced if a very small amount of a water soluble polyvinyl alcohol is dissolved together with the emulsifier in the organic solvents used. This is particularly surprising in view of the fact that the polyvinyl alcohol when used alone, regardless of the amount used, will not produce any apparent emulsification in water of the solvent and insecticide. It was noted that even though the polyvinyl alcohol could not itself be used as an emulsifier, the use of very small quantities of polyvinyl alcohol, substantially less than .02% of the entire solution, would considerably reduce the amount of the ordinary emulsifiers used.

For example, tests were carried out with benzene hexachloride (a mixture of isomers including the gamma isomer), and DDT as the active insecticide ingredient. In each instance surprising results were obtained with respect to the amount of emulsifier necessary when the solvents for these insecticide ingredients were first substantially saturated with a water-soluble polyvinyl alcohol.

Normally it required 10 to 20% by weight of the emulsifier (based on total organic phase), depending on the particular emulsifiers and solvent used, to obtain a reasonably stable emulsion when preparing emulsion concentrates of benzene hexachloride. However, on saturation of the solvents, in the emulsion concentrate, with a partially hydrolyzed water-soluble polyvinyl alcohol of medium viscosity only 2 to 3% of emulsifier was required to produce an emulsion of reasonable stability when emulsified in water. It was determined that the actual amount of the polyvinyl alcohol required to saturate the solvents amounted to approximately 0.02% by weight of the entire solution. Furthermore, tests established that the resulting emulsion was as toxic, in equal concentrations of gamma isomer, as if no addition agents were present.

In another illustrative test, it was found that saturating the solvents with a water-soluble polyvinyl alcohol in an emulsion concentrate of DDT allowed a reduction of the emulsifier, in the emulsion concentrate, of from 3.2% to 1%.

The benzene hexachloride emulsion concentrates of my present invention preferably contain, dissolved in 57 to 87 parts by weight of an organic solvent for benzene hexachloride, 10 to 40 parts of a benzene hexachloride having a sufficiently high gamma isomer content to be toxic to insects, 1 to 3 parts of an emulsifier for said solvent to emulsify the same in water and a small amount of polyvinyl alcohol. The amount of polyvinyl alcohol is preferably sufficient to substantially saturate the solution with respect to the polyvinyl alcohol. When preparing DDT emulsion concentrates, I prefer to use 60 to 70 parts by weight of an organic solvent for the DDT in which is dissolved 25 to 35 parts DDT together with 1 to 4 parts of an emulsifier for the solvent to enable emulsification of the solvent in water and a small amount of polyvinyl alcohol, the polyvinyl alcohol being present preferably in an amount sufficient to substantially saturate the solvent with respect to the polyvinyl alcohol.

The amount of polyvinyl alcohol used is generally in the range of 0.01 to 0.04%. Since in many instances, the organic solvent used is saturated with as little as 0.02 part polyvinyl alcohol, the range employed might more accurately be stated as being from about 0.01% to the amount necessary to saturate the solvent with the polyvinyl alcohol.

The term polyvinyl alcohol as used in the specification and the appended claims is intended to include mixtures of those polymeric compounds which contain a plurality of the groups —CH₂CHOH— therein, these compounds generally being prepared by the partial or complete hydrolysis of polyvinyl esters such, for example, as polyvinyl acetate. Water-soluble polyvinyl alcohols, as above defined, may vary in saponification number from 0 to 250 and their viscosity in aqueous solution may vary from 4 to 120 centipoises for a 4% solution at 20° C. In practicing the present invention, however, polyvinyl alcohols are preferred which have a saponification number between 80 and 245 and a viscosity in a 4% aqueous solution at 20° C. of between 10 to 60 centipoises.

The following are some examples of emulsion concentrates made with and without the addition of polyvinyl alcohol. It will be noted that in each case the addition of a very small amount of a water-soluble polyvinyl alcohol resulted in a considerable reduction of the emulsifier necessary.

In the particular examples given the polyvinyl alcohol used was one of the commercially available products of this type, which are believed to be made by hydrolyzing polyvinyl acetate to the extent of 86 to 93%. These polyvinyl alcohols had a medium viscosity, the viscosity being between 20–25 centipoises in a 4% water solution at 20° C. and a density of 1.22 to 1.30 at 20° C. The invention should not, however, be limited to these particular polyvinyl alcohols since other water-soluble polyvinyl alcohols can be used in practicing my invention in that they will, when used in very small quantities, reduce to a considerable extent the amount of emulsifier required.

*Example 1*

| Without Polyvinyl Alcohol | | With Polyvinyl Alcohol | |
|---|---|---|---|
| | Per cent | | Per cent |
| Benzene Hexachloride (36% gamma isomer content) | 30.6 | Benzene Hexachloride (36% gamma isomer content) | 30.6 |
| Xylene (Solvent) | 29 | Xylene (Solvent) | 33.44 |
| Mixture of di- and tri-Methylated Naphthalenes (Solvent) | 29 | Mixture of di- and tri-Methylated Naphthalenes (Solvent) | 33.44 |
| Dimeric alkylated aryl polyether (sold by Rohm & Haas under the trade-name of Triton X-155) (Emulsifier) | 12 | Dimeric alkylated aryl polyether (sold by Rohm & Haas under the trade-name of Triton X-155) (Emulsifier) | 2.50 |
| | | Polyvinyl alcohol | 0.02 |

*Example 2*

| Without Polyvinyl Alcohol | | With Polyvinyl Alcohol | |
|---|---|---|---|
| | Per cent | | Per cent |
| Benzene Hexachloride | 30.6 | Benzene hexachloride | 30.6 |
| N-Butyl Alcohol (Solvent) | 10.0 | N-Butyl Alcohol (Solvent) | 10.0 |
| Xylene (Solvent) | 49.4 | Xylene (Solvent) | 46.88 |
| Alkylated aryl polyether (sold by Rohm & Haas under the trade-name of Triton X-100) (Emulsifier) | 10.0 | Alkylated aryl polyether (sold by Rohm & Haas under the trade-name of Triton X-100) (Emulsifier) | 2.5 |
| | | Polyvinyl Alcohol | 0.02 |

*Example 3*

| Without Polyvinyl Alcohol | | With Polyvinyl Alcohol | |
|---|---|---|---|
| | Per cent | | Per cent |
| Benzene Hexachloride | 30.6 | Benzene Hexachloride | 30.6 |
| Xylene (Solvent) | 33.45 | Xylene (Solvent) | 33.44 |
| Mixture of di- and tri-Methylated Naphthalenes (Solvent) | 33.45 | Mixture of di- and tri-Methylated Naphthalenes (Solvent) | 33.44 |
| Dimeric alkylated aryl polyether (sold by Rohm & Haas under the trade name of Triton X-155) (Emulsifier) | 2.5 | Dimeric alkylated aryl polyether (sold by Rohm & Haas under the trade name of Triton X-155) (Emulsifier) | 2.5 |
| (Forms very poor watery emulsion settling rapidly.) | | Polyvinyl Alcohol (Forms excellent creamy emulsion with good stability.) | 0.02 |

*Example 4*

| Without Polyvinyl Alcohol | | With Polyvinyl Alcohol | |
|---|---|---|---|
| | Per cent | | Per cent |
| DDT | 34.3 | DDT | 34.3 |
| Xylene (Solvent) | 29.0 | Xylene (Solvent) | 30.49 |
| Mixture of di- and tri-Methylated Naphthalenes (Solvent) | 32.6 | Mixture of di- and tri-Methylated Naphthalenes (Solvent) | 34.19 |
| Dimeric alkylated aryl polyether (sold by Rohm & Haas under the trade name of Triton X-155) (Emulsifier) | 3.2 | Dimeric alkylated aryl polyether (sold by Rohm & Haas under the trade name of Triton X-155) (Emulsifier) | 1.00 |
| | | Polyvinyl Alcohol | 0.02 |

The emulsifying characteristics of the preparations given above, with and without polyvinyl alcohol, are approximately the same with the exception of the formulations given in Example 3. Also, the toxicity of the formulations in which the polyvinyl alcohol was used were found to be considerably greater, in the benzene hexachloride formulations (on the basis of active insecticidal ingredient), than the toxicity of the corresponding formulation in which a larger amount of emulsifier and no polyvinyl alcohol was used.

In preparing the emulsion concentrates in the above formulations it was found preferable to first dissolve the insecticide ingredient in the solvents used then add the polyvinyl alcohol while agitating the solution, finally adding the emulsifying agents used.

Many solvents, other than those given in the specific examples, could be used for the benzene hexachloride and the DDT together with a large variety of emulsifiers. Some of these are, for benzene hexachloride, solvents: Benzene, toluene, carbon tetrachloride, cyclohexanone, ethylacetate; emulsifiers: Alkylated aryl polyether alcohol, phthalic glycerol alkyd resin, Sorbitan monoleate; for DDT, solvents: Acetone, benzene, cyclohexanone, 1,4-dioxane; emulsifiers: Fatty acid condensates, phthalic glycerol alkyd resins, alkylated aryl polyether alcohol.

From the foregoing, it is apparent that various formulations may be used in which the ingredients and proportions may be widely varied without departing from the scope of the invention. The invention should, therefore, not be limited by any of the specific examples given but should be limited only as defined in the appended claims.

I claim:

1. An insecticide composition comprising a normally solid substantially non-water-soluble compound toxic to insects dissolved in an organic solvent for said compound, an emulsifier for said organic solvent other than a polyvinyl alcohol, and enough water soluble polyvinyl alcohol to substantially saturate said organic solvent.

2. An insecticide composition comprising 10 to 40 parts by weight of benzene hexachloride having some gamma isomer content, 57 to 87 parts by weight of an organic solvent for said benzene hexachloride, 1 to 3 parts by weight of an emulsifier for said organic solvent other than a polyvinyl alcohol, and enough water-soluble polyvinyl alcohol to substantially saturate said organic solvent.

3. An insecticide composition comprising 10 to 40 parts of benzene hexachloride having a gamma isomer content of at least 10%, 57 to 87 parts of an organic solvent for said benzene hexachloride, 1 to 3 parts of an emulsifier for said organic solvent other than a polyvinyl alcohol, and a small amount of a water-soluble hydrolyzed polyvinyl acetate having a saponification number of about 80 to 245 and a viscosity in 4% aqueous solution at 20° C. of between 10 to 60 centipoises said water-soluble hydrolyzed polyvinyl acetate being in sufficient concentration to substantially saturate said organic solvent.

4. An insecticide composition comprising 25 to 35 parts by weight of DDT, 60 to 70 parts by weight of an organic solvent for said DDT, 1 to 4 parts by weight of an emulsifier for said organic solvent other than a polyvinyl alcohol, and enough of a water-soluble polyvinyl alcohol to substantially saturate said organic solvent.

5. An insecticide emulsion concentrate comprising 25 to 35 parts DDT, 25 to 40 parts xylene, 20 to 40 parts di and tri methylated naphthalene, 1 to 2 parts of a dimeric alkylated aryl polyether and 0.01 to 0.04 part of a water-soluble polyvinyl alcohol hydrolyzed between 86–93% and having a density and a viscosity in a 4% aqueous solution at 20° C. of 1.22 to 1.30 at 20° C. of between 20–25 centipoises.

6. An insecticide composition comprising substantially 34 parts DDT, 31 parts xylene, 34 parts di and tri methylated naphthalenes, 1 part of a dimeric alkylated aryl polyether and 0.02 part of a water-soluble polyvinyl alcohol 86 to 93% hydrolyzed and having a viscosity between 20–25 centipoises in a 4% aqueous solution at 20° C.

7. An insecticide composition comprising an emulsifiable solution including an organic solvent having dissolved therein a normally solid substantially non-water-soluble chlorinated organic compound toxic to insects, an emulsifier for said organic solvent and about 0.01 to saturation concentration of a water soluble polyvinyl alcohol.

8. An insecticide composition according to claim 7 in which the compound toxic to insects is benzene hexachloride having some gamma isomer therein.

9. An insecticide composition according to claim 7 in which the compound toxic to insects is DDT.

10. The insecticide composition of claim 3 in which the solvent is a mixture of xylene and di and tri methylated naphthalenes.

11. The insecticide composition of claim 3 in which the emulsifier is a dimeric alkylated aryl polyether.

THADDEUS PARR.

REFERENCES CITED

The following references are of record in the file of this patent:

UNITED STATES PATENTS

| Number | Name | Date |
|---|---|---|
| 2,416,460 | Smith et al. | Feb. 25, 1947 |
| 2,420,295 | Biehn et al. | May 13, 1947 |
| 2,452,759 | Hyman | Nov. 2, 1948 |

FOREIGN PATENTS

| Number | Country | Date |
|---|---|---|
| 573,689 | Great Britain | Dec. 3, 1945 |

OTHER REFERENCES

Mantell: "The Water Soluble Gums," Nov. 1947, pp. 152–154. Reinhold Pub. Corp., N. Y.

Lesser: The Drug and Cosmetic Industry, vol. 56, No. 4, pp. 442–445, 520, 522 (see p. 443), Apr. 1945.

Jones et al.: J. Econ. Ent., vol. 39, No. 6, Dec. 1946, pp. 735–740.

King: Manf. Perfumer, Sept. 1941, pp. 211–213 (see particularly p. 213).